United States Patent Office 3,276,795
Patented Oct. 4, 1966

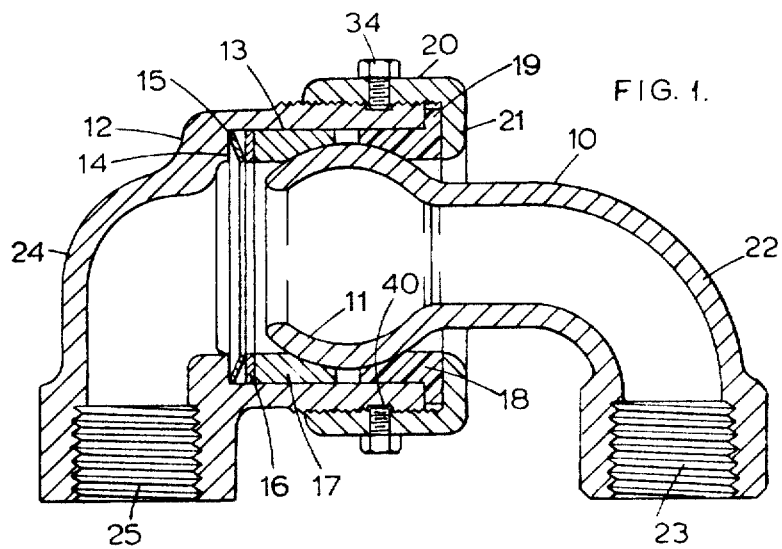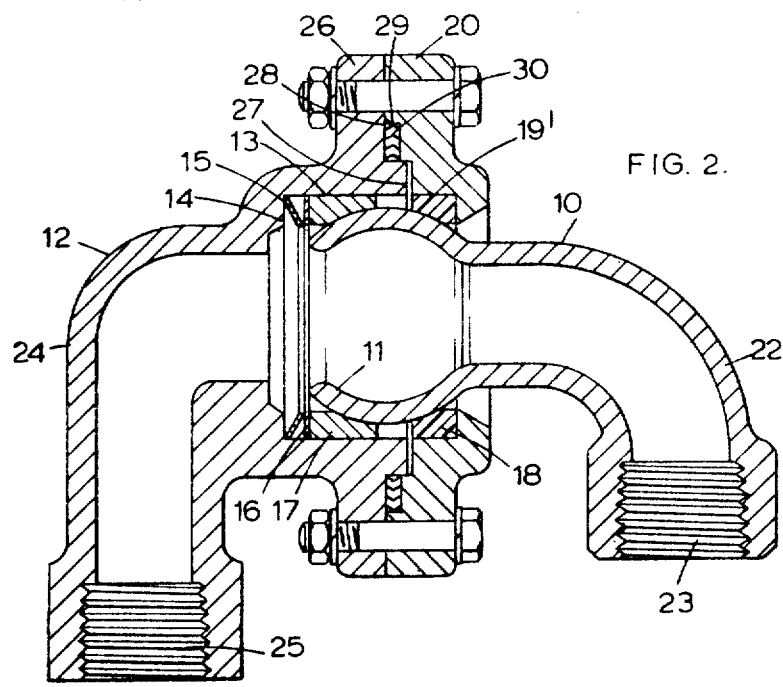

3,276,795
PIPE COUPLINGS
John Trevor Nicholas Heygate, Windsor, England, assignor to J. R. H. Products & Company Limited, Windsor, England
Filed Dec. 5, 1963, Ser. No. 328,243
Claims priority, application Great Britain, Dec. 7, 1962, 46,319/62, 46,320/62; May 24, 1963, 20,851/63
2 Claims. (Cl. 285—181)

This application is a continuation in part of my copending application, Serial Number 153,857, filed November 21, 1961, now Patent Number 3,180,649.

This invention relates to pipe couplings and its object is to provide a coupling allowing universal movement of the pipes with packing which remains fluid-tight in spite of variations of temperature such as may occur by passing steam and cold water alternately through the pipes as required for various purposes.

According to this invention there is provided a pipe coupling comprising a first pipe having a frusto-spherical part located within one end of a second pipe and a flanged ring, with an inwardly flanged portion, connected to the second pipe, a gap being provided radially between opposed surfaces of the two pipes, which gap contains two sealing rings, shaped to make intimate contact with the frusto-spherical portion of the first pipe on opposite sides of the spherical centre, the innermost of the said rings being urged by spring means against the frusto-spherical part, and the outer ring being held against this part either by said ring, the inner sealing ring being metallic, the outer sealing ring being made of synthetic plastics material, and the spring means being in the form of a single frusto-conical spring ring.

Thus in one embodiment of this invention the outer ring is located in a recess in a flange ring which surrounds the first pipe and which is screwed on to the second pipe or bolted to an outwardly extending flange on that pipe. In such constructions it is often found advantageous to interpose a packing ring between the flange ring and the second pipe or flange on that pipe.

The outer of the sealing rings is made of a synthetic plastic material. Polytetrafluoroethylene is particularly suitable. The inner ring is made of metal. Graphite impregnated bronze or iron is particularly suitable.

It is advantageous to provide a metal supporting ring surrounding the first pipe and supporting the inner annular part of the outer ring at the end remote from the other packing ring. This enables the pipe coupling to be used at higher temperatures and pressures which would normally deform the packing ring and cause leakage. The use of this arrangement with a metallic inner packing ring is very suitable for high pressures.

The two pipes which are coupled together may be straight or one or both of the pipes may be angled.

When tar, or a medium of similar consistency to tar, is passed through the pipe coupling it is often found desirable to steam jacket the pipe coupling in order to prevent solidity of the fluid. Filters may be fitted to the bore of the pipe coupling should the fluid passing through the coupling require to be filtered.

Two forms of construction of the pipe coupling of this invention are illustrated in the accompanying drawings. Both figures show a cross-sectional elevation of a pipe coupling constructed in accordance with this invention. Referring to FIGURE 1, the pipe coupling is formed by a pipe 10 having a frusto-spherical part 11 which is located within one end of a pipe 12. The pipe 12 is formed with a recess 13 containing the frusto-spherical part 11 and the recess 13 ends with an annular abutment shoulder 14. A stainless steel dished washer type spring 15 consisting of a single frusto-conical ring bears against the shoulder 14 and a brass ring 16 is arranged between the spring 15 and the flat end of a sealing ring 17, the latter having an internal frusto-spherical surface which engages the inner part of the frusto-spherical surface of the part 11 and is urged against it by the spring 15.

On the opposite side of the spherical centre of the part 11 there is provided a further sealing ring 18 which also has a frusto-spherical surface for engaging the outer part of the frusto-spherical surface of the part 11. The ring 18 is formed with an outwardly extending flange 19 by means of which the ring 18 is clamped between the pipe 12 and a clamping ring 20. The clamping ring 20 is screwed onto the outside of the pipe 12 and clamps the flange 19 by means of an inwardly projecting annulus 21.

The pipe 10 is formed with an elbow portion 22 which ends with a female connecting portion 23. The pipe 12 is formed with an elbow portion 24 which also ends with a female connecting portion 25.

The inner sealing ring 17 has a constant outer diameter where it engages the second pipe 12 and the outer sealing ring 18 has the same outer diameter apart from the flange 19.

The metal ring 16 prevents damage to the sealing ring 17 by the spring 15.

The sealing ring 17 is made of metal e.g. graphite impregnated bronze and the sealing ring 18 is made of a synthetic plastics material e.g. polytetrafluoroethylene which may be filled with glass fibres.

The frusto-spherical part 11 has a spherical interior whereby the thickness of the pipe 10 is maintained approximately constant and a fluid pressure therein tends to maintain the seal.

Instead of using a dished steel washer 15 of stainless steel we may use a nickel-chromium base alloy (e.g. known as Nimonic alloy 90) and the spring washer may be a corrugated washer.

By using a metal sealing ring 17 which does not deform under high pressure and relying on a softer ring 18 for maximum sealing effect it is possible to employ a single frusto-conical spring ring 15 instead of longer springs and this provides the very important advantage that the joint can be taken apart on site for repair and re-assembled by hand whereas when axially longer stiff springs are used it is impossible to re-make the joint by hand.

The combination of a metal inner packing ring 17 with an outer packing 18 made of synthetic plastic such as polytetrafluoroethylene has been found to give surprising durability and safety under high pressures and temperatures.

With reference to FIGURE 2, the pipe coupling is formed by a pipe 10 having a frusto-spherical part 11 which is located within one end of pipe 12. The pipe 12 is formed with a recess or bore 13 containing the frusto-spherical part 11 and the recess 13 ends with an annular abutment shoulder 14. A stainless steel dished washer type spring 15 in the form of a single frusto-conical ring bears against the inner surface and a metal thrust ring 16 e.g. brass or stainless steel is arranged between the spring and the flat end of a metal, e.g. graphite impregnated bronze, sealing ring 17 making intimate contact with the frusto-spherical part of the first pipe against which it is urged by the spring 15. A ball bearing thrust ring may be used instead of the metal ring 16.

On the opposite side of the spherical centre of the part 11 there is provided a second sealing ring 18 which also makes intimate contact with the frusto-spherical part of pipe 10. The rings 17, 18 have interior frusto-spherical surfaces engaging the inner and outer parts of the frusto-spherical surface of the pipe 12.

This outer sealing ring 18 engages in a recess 19' in a flange ring 20 which surrounds the first pipe. The ring 18 is made of synthetic plastics material e.g. polytetrafluoroethylene which may be filled with glass fibres.

A flange 26 is formed integrally with the second pipe and extends radially outwardly thereof at a short distance from the inner exterior transverse surface 27 to provide an outer transverse surface 28. A recess 29 in the flange ring 20 is provided, to accommodate a packing ring 30 between the two flange members.

The packing ring between the flanges is a spiral wound gasket of stainless steel and asbestos.

The pipe 10 is formed with an elbow portion 22 which ends with a threaded female connecting portion 23. The pipe 12 is formed with an elbow portion 24 which also ends with a threaded female connecting portion 25. Instead of threads the joints 23, 25 may be welded.

In a modification (not shown) the flange ring has a tubular extension surrounding the first pipe. A collar is screwed onto the first pipe and a washer is interposed between this and the tubular extension.

The tubular extension contains a bearing cylinder between it and the pipe.

The flange ring 20 has a cylindrical opening 33, about the same size as the opening in the polytetrafluoroethylene sealing ring 18 and its support ring, and large enough to give the first pipe adequate freedom of tilting motion. The flange 20 may be locked in position on to the outside of pipe 12 by means of two diametrically opposed setscrews 34 and 35. These screws are threaded into tapped holes in the flange ring 20 and engage in a groove 40 formed by cutting away some of the threads on the pipe 12. When the screws are tightened they act on the undercut part, the thread is not damaged, and the screws lock the nut firmly in any required position.

The undercut portion of the thread is made large enough axially so that when the packing rings wear down the screws can be loosened the nut tightened and then the screws re-tightened to lock the nut in its new position. The holes in the nut are preferably so arranged that when the nut is tightened on to the new packing rings the screws tighten down on to the end of the undercut adjacent the end of the elbow part 12 on which the nut is screwed. This allows for maximum adjustment of the nut.

The pipe 10 is formed with a female connecting portion 23. The pipe is formed with an elbow portion 24 which also ends with a female connecting portion 25.

In a modification not shown the flange ring has a tubular extension providing a bearing for the first pipe when angular misalignment of the pipes is not required.

The ring 17 being made of metal does not necessarily form a complete seal as does the softer ring 18. The ring 17 might therefore be alternatively described as a thrust ring.

If desired lead pellets may be located in the grooves 40 to avoid damage to the pipe threads should anyone try to disengage the pipes without first slacking back the setscrews 34, 35.

I claim:

1. A pipe coupling comprising a first pipe having a frustro-spherical male part, a second pipe having a female socket at one end, an abutment wall at the inner end of said socket internally thereof, said frustro-spherical part being located within said socket, a flanged ring connected to the second pipe, said flanged ring having an inwardly flanged portion, a gap being provided radially between opposed surfaces of the frustro-spherical part and the socket, two sealing rings being shaped to make intimate contact with the frustro-spherical portion of the first pipe on opposite sides of the spherical center thereof, a single frustro-conical spring ring located against said abutment wall, a relatively hard washer located between said spring ring and the innermost of said sealing rings, the inner sealing ring being made of graphite impregnated metal, the outer sealing ring being made of high melting point synthetic resin, said outer sealing ring having an outer peripheral shape to seat in said socket of said second pipe, said outer sealing ring also having an outwardly ertending integral flange clamped between said inwardly flanged portion and the end of said socket.

2. A pipe coupling comprising a first pipe having a frusto-spherical part, a second pipe having a cylindrical end portion, an abutment wall at the inner end of said cylindrical end portion internally thereof, said frustospherical part being located within said cylindrical end portion, a flanged ring connected to the second pipe, said flanged ring having an inwardly flanged portion, a gap being provided radially between opposed surfaces of the frusto-spherical part and the cylindrical end portion, two sealing rings in said gap, said sealing rings being shaped to make intimate contact with the frusto-spherical portion of the first pipe on opposite sides of the spherical centre thereof, a single frusto-conical spring ring located against said abutment wall, a metal washer located between said spring ring and the innermost of said sealing rings, the inner sealing ring being made of graphite impregnated metal, the outer sealing ring being made of synthetic plastics material, said outer sealing ring having a cylindrical part engaged in said cylindrical end portion of the second pipe, said outer sealing ring also having an outwardly extending flange integral with its cylindrical part, said flange being clamped between said flanged ring and the free end of the cylindrical portion of the second pipe.

References Cited by the Examiner
UNITED STATES PATENTS

| | | | |
|---|---|---|---|
| 859,426 | 7/1907 | Betz | 285—269 X |
| 1,604,867 | 10/1926 | Woodruff | 285—267 |
| 1,914,736 | 6/1933 | Coutu | 285—271 |
| 1,943,122 | 1/1934 | Kinzel | 277—11 |
| 2,151,833 | 3/1939 | Bugatti | 285—201 |
| 2,383,679 | 8/1945 | Phillips | 285—271 |
| 2,473,502 | 6/1949 | Bard | 285—271 X |
| 2,531,020 | 11/1950 | Bard | 285—267 |
| 2,550,536 | 4/1951 | Delano | 285—267 |
| 2,746,775 | 5/1956 | Leonard | 285—375 X |
| 2,963,304 | 12/1960 | Comlossy | 277—188 X |

FOREIGN PATENTS

| | | |
|---|---|---|
| 1,306,749 | 9/1962 | France. |
| 625,612 | 6/1949 | Great Britain. |
| 701,590 | 6/1954 | Great Britain. |

CARL W. TOMLIN, *Primary Examiner.*

S. R. MILLER, D. W. AROLA, *Assistant Examiners.*